(12) United States Patent
Doy et al.

(10) Patent No.: US 11,041,276 B2
(45) Date of Patent: Jun. 22, 2021

(54) TOOL EXPOSED STATUS AND LOCKOUTS

(71) Applicant: Caterpillar Paving Products Inc., Brooklyn Park, MN (US)

(72) Inventors: Nathaniel S. Doy, Maple Grove, MN (US); Lee M. Hogan, Champlin, MN (US); Jason W. Muir, Andover, MN (US); Hyppolite Kuissi, Peoria, IL (US); Jacob M. Saari, Otsego, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/366,114

(22) Filed: Mar. 27, 2019

(65) Prior Publication Data

US 2020/0308782 A1    Oct. 1, 2020

(51) Int. Cl.
  *E01C 23/088*   (2006.01)
  *E01C 23/12*    (2006.01)
  *E01C 23/06*    (2006.01)

(52) U.S. Cl.
  CPC .......... *E01C 23/088* (2013.01); *E01C 23/127* (2013.01); *E01C 23/065* (2013.01)

(58) Field of Classification Search
  CPC .................................................... E01C 23/088
  USPC .............................. 299/1.5, 39.6; 404/84.05
  See application file for complete search history.

(56) References Cited

U.S. PATENT DOCUMENTS

| | | |
|---|---|---|
| 5,984,420 A * | 11/1999 | Murray ................... E01C 19/00 |
| | | 172/4.5 |
| 6,293,562 B1 | 9/2001 | Kutscher |
| 6,498,967 B1 | 12/2002 | Hopkins et al. |
| 6,769,836 B2 | 8/2004 | Lloyd |
| 8,764,118 B1 | 7/2014 | Krishnamoorthy et al. |
| 8,888,194 B2 | 11/2014 | Killion |
| 9,038,289 B2 | 5/2015 | Kelly |
| 9,057,161 B2 | 6/2015 | Berning et al. |
| 9,605,393 B2 | 3/2017 | Schlenker et al. |
| 9,879,391 B2 | 1/2018 | Berning et al. |

(Continued)

FOREIGN PATENT DOCUMENTS

| | | |
|---|---|---|
| CN | 102644232 | 8/2012 |
| CN | 205368983 | 7/2016 |

(Continued)

OTHER PUBLICATIONS

"U.S. Appl. No. 16/365,983, Notice of Allowance dated Jul. 21, 2020".

(Continued)

*Primary Examiner* — Sunil Singh
(74) *Attorney, Agent, or Firm* — Schwegman, Lundberg & Woessner

(57) ABSTRACT

An implement with a ground-engaging tool may include a frame supported above a surface of a ground by a ground-engaging portion and a suspension, a tool supported by and adjustable relative to the frame and configured for working the ground, a housing arranged around portions of the tool and secured to the frame, and a monitor system configured for identifying an exposed condition of the tool. A method of managing an exposed condition of a ground-engaging tool and a method of operating an implement with a ground-engaging tool are also described.

19 Claims, 13 Drawing Sheets

(56) References Cited

U.S. PATENT DOCUMENTS

| | | | |
|---|---|---|---|
| 9,970,164 B2 | 5/2018 | Fritz et al. | |
| 2002/0047301 A1 | 4/2002 | Davis | |
| 2008/0153402 A1 | 6/2008 | Arcona et al. | |
| 2012/0301220 A1* | 11/2012 | Snoeck | E01C 23/088 |
| | | | 404/75 |
| 2015/0117951 A1* | 4/2015 | Schlenker | E01C 23/088 |
| | | | 404/84.05 |
| 2016/0326701 A1 | 11/2016 | Schlenker et al. | |
| 2017/0362784 A1 | 12/2017 | Hoffmann et al. | |
| 2018/0058020 A1* | 3/2018 | Berning | E01C 23/127 |
| 2018/0340302 A1 | 11/2018 | Menzenbach et al. | |

FOREIGN PATENT DOCUMENTS

| | | |
|---|---|---|
| CN | 107881883 | 4/2018 |
| CN | 108004894 | 5/2018 |
| CN | 207392004 | 5/2018 |
| EP | 0547378 | 6/1993 |

OTHER PUBLICATIONS

"U.S. Appl. No. 16/366,332, Notice of Allowance dated Sep. 2, 2020".

* cited by examiner

TOOL EXPOSED STATUS AND LOCKOUTS

TECHNICAL FIELD

The present disclosure relates to protecting against exposed tool conditions of a machine or implement. More particularly, the present disclosure relates to identifying an exposed condition of a tool and taking measures to lock out the tool and/or provide notifications to personnel. Still more particularly, the present disclosure relates to identifying an exposed condition of a rotor on a rotary mixer and locking out or notifying ground personnel regarding the same.

BACKGROUND

Various machines or implements may include ground engaging tools for interacting, treating, or modifying the ground as the machine or implement travels. Such machines or implements may include plows, planters, or fertilizing equipment in the agricultural industry. In the construction industry, such machines or equipment may include earth movers or cold planers, rotary mixers, or other milling machines, for example. Still other examples may include grooming equipment for various situations.

The position of the ground-engaging tool relative to the ground can be important for an operator to know and monitor for several reasons. For purposes of completing the job at hand, the depth of the tool in the ground may be an important factor. That is, when planting, for example, a planter may want to control the furrow depth. When redressing a roadway bed, the operator may want to ensure that a particular amount of existing pavement, existing ground, and/or underlayment is being processed.

In many of the above listed examples, the various spatial relationships between the ground engaging tool, a portion of the machine that supports the tool, and the ground may be difficult to assess. Due to this problem, some of the above machines may simply allow the tool to rest on the ground and "float" relative to the machine using particular offset features to create the relationship desired between the ground and the tool. However, where larger amounts of power are desired and, where for example, the weight of the machine is desired to be used to more powerfully engage the ground, the tool may be adjustably fixed to the machine for engaging the ground rather than "floating."

In these circumstances, the relationship of the machine with the ground and the relationship between the machine and the tool may be helpful in determining the tool/ground relationship. However, due to several factors, these relationships are not always readily ascertainable. For example, inconsistent, uneven, soft, loose, or hard ground surfaces may cause the machine or implement to ride differently depending on the nature of the surface it is being used on. Machine tolerances may differ from one machine to another and may change over time as parts and components wear. Tire pressures on larger machines may affect the height that the machine rides relative to the ground. Suspension or other wheel connection features may create disparities from machine to machine or from one portion of the machine to another. Side-to-side unevenness on the ground can also create difficulty when establishing a relationship between a tool and the ground. Still further, adjustable components of the machine may add to the complicated nature of establishing the tool's position relative to the ground.

Other related technologies may include some of the following. For example, Chinese patent 102,644,232 relates to a milling machine and a control method and control device of a milling machine. U.S. Patent Application 2018/0058020 relates to a method for working ground pavements, as well as a self-propelled construction machine. However, a distinction between a reclaimer (i.e., rotary mixer) and a cold planer is that the rotor of a reclaimer is adjustable in height relative to the frame of the machine, whereas a rotor on a cold planer is typically fixed relative to the machine. Different issues arise when dealing with a rotary mixer or other implement where the ground-engaging tool is adjustable relative to the frame of the machine.

SUMMARY

In one or more embodiments, an implement with a ground-engaging tool may include a frame supported above a surface of a ground by a ground-engaging portion and a suspension. The implement may also include a tool supported by and adjustable relative to the frame and configured for working the ground. The implement may also include a housing arranged around portions of the tool and secured to the frame. The implement may also include a monitor system configured for identifying an exposed condition of the tool.

In one or more embodiments, a method of managing an exposed condition of a ground-engaging tool may include monitoring the position of a ground-engaging tool relative to the ground, monitoring the position of a ground-engaging tool relative to a bottom of a surrounding housing, and identifying an exposed condition when the ground-engaging tool is below the bottom and above the ground.

In one or more embodiments, a method of operating an implement with a ground-engaging tool may include receiving a notification that the ground-engaging tool is in an exposed condition and adjusting a feature of the machine until the tool is no longer exposed. Adjusting a feature of the machine may include adjusting a leg of the implement to lower a housing around the tool until it is in contact with the ground. Alternatively or additionally, adjusting a feature of the machine may include adjusting a position of the ground-engaging tool to a position within the housing.

DETAILED DESCRIPTION

Figure 1:
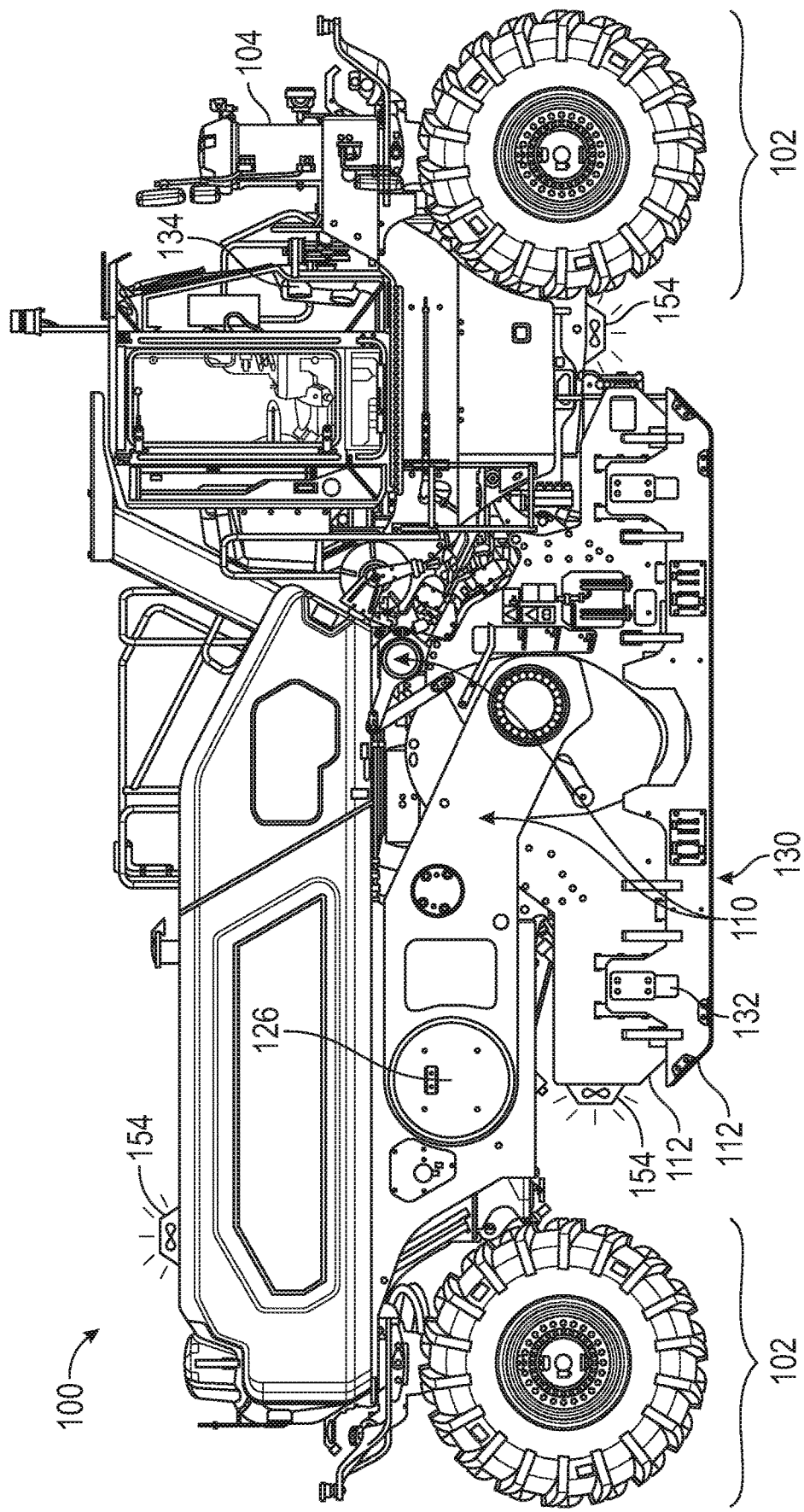
FIG. 1 is a side view of a rotary mixer, according to one or more embodiments.
Figure 2:
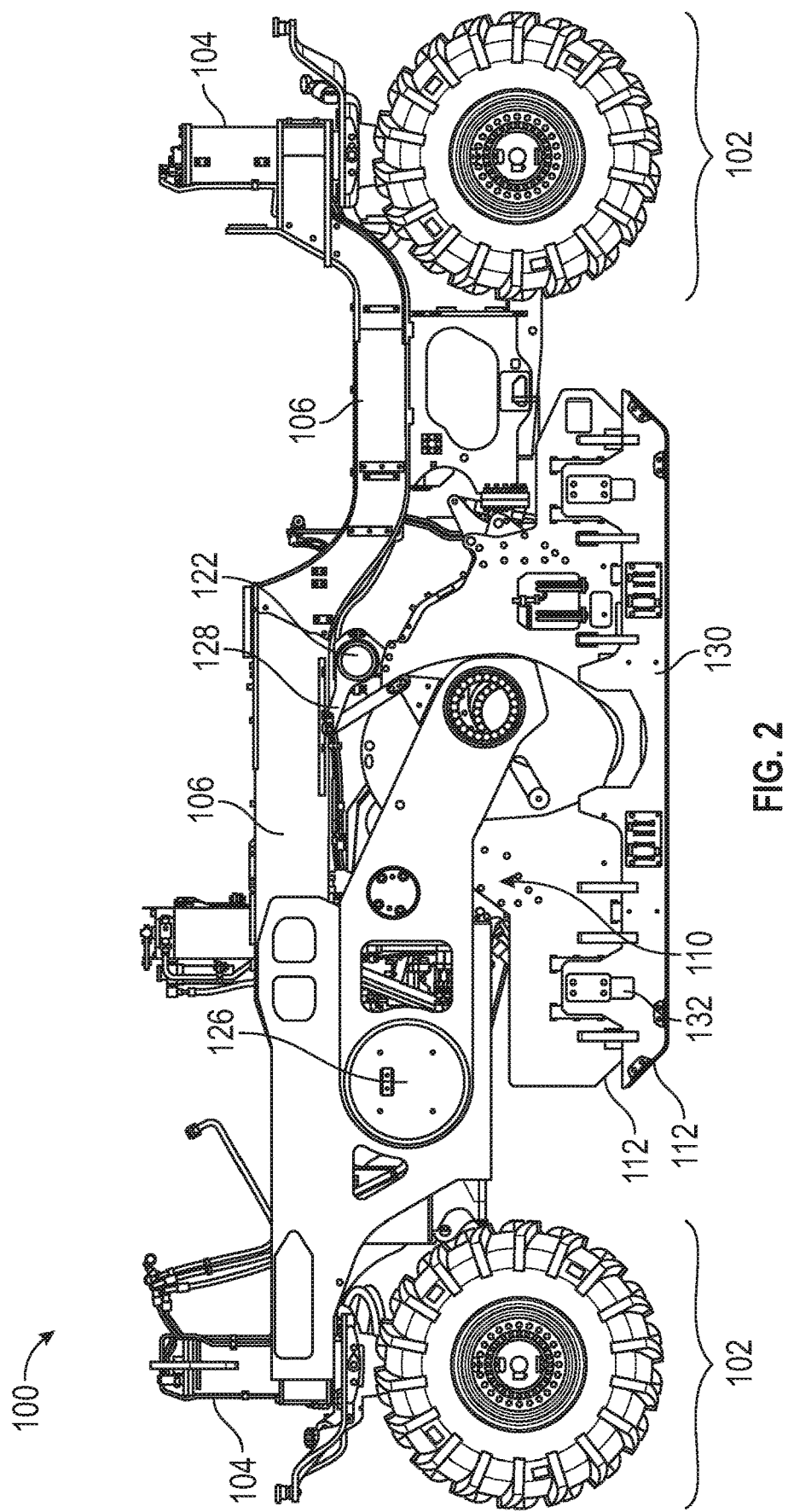
FIG. 2 is a side view of a frame and rotor portion of a rotary mixer, according to one or more embodiments.
Figure 3:
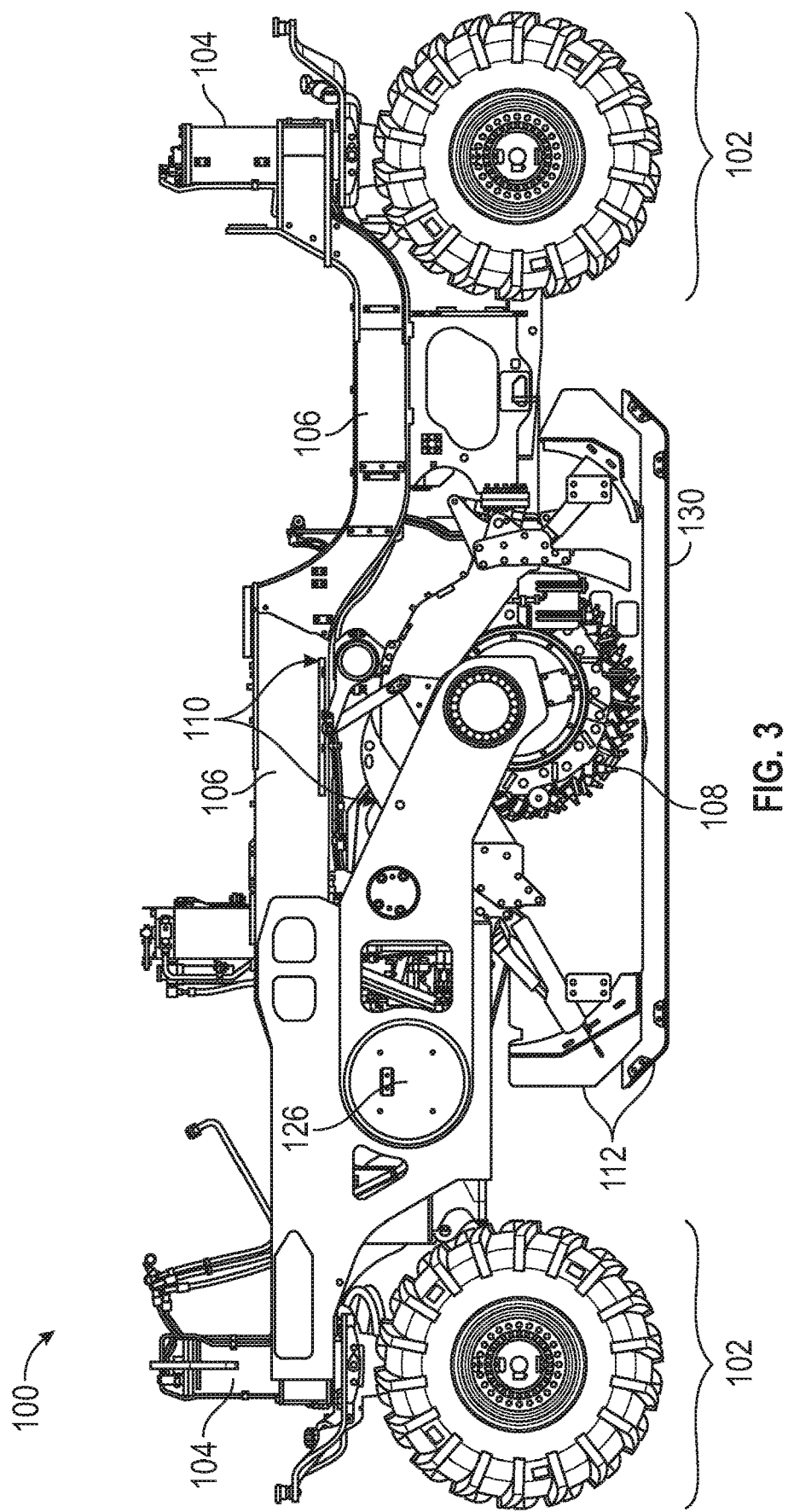
FIG. 3 is aside view of the frame and rotor portion of FIG. 2 with a side of the rotor housing removed, according to one or more embodiments.

Referring now to FIGS. 1-3, a rotary mixer 100 is shown. The rotary mixer may 100 be adapted to cut and/or process a top layer of the ground such as an existing roadway or a new or existing roadway bed. In particular, the rotary mixer 100 may be adapted to cut and/or process a top layer of dirt, gravel, pavement, or other soil. The cutting/processing may involve tearing the desired layer up, mixing it, and laying it back down in a more homogenous arrangement allowing the surface to be compacted and pavement to be placed thereon. As such, the position of the rotor relative to the surface of the ground and, accordingly, the depth of cut that the rotor is performing, are valuable parameters to assess and to be able to control. Various components of the rotary mixer 100 may be relevant in assessing and controlling the rotor position relative the ground. For example, the rotary mixer 100 may include a ground-engaging portion 102, a suspension system 104, a frame 106, a rotor 108, a rotor support system 110, and a rotor housing 112. Apart from the rotor housing 112, a portion of which may float compared to the rotor 108, each of these components may play a role in controlling the position of the rotor 108 relative to the ground.

The ground-engaging portion 102 may engage the ground for purposes of supporting the rotary mixer 100. For example, the ground-engaging portion 102 may include a plurality of wheels or tracks for supporting the rotary mixer 100 and translating the rotary mixer 100 along the ground. In one or more embodiments, the ground-engaging portion 102 may include four wheels. Alternatively, three wheels may be provided. The wheels may include tractor-type wheels of relatively large size with tires having treads for engaging soft and/or loose soils. The wheels/tires may have a large width for distributing high loads to soft soils without sinking and a large diameter for more readily managing holes, obstructions, or sinkage in the soft soils. However, tire size may be selected based on machine weight, anticipated use conditions, or other factors, and most any suitable tire size may be used.

The ground-engaging portion 102 may include an axle or axles tying corresponding wheels together, or the wheels may be independent from one another. The ground-engaging portion 102 may be powered to advance the mixer 100 across the ground and, as such, a drive axle or drive shaft may extend to pairs of wheels or each individual wheel. The drive axle or shaft may be powered by a combustion engine having a transmission for transferring power to the drive shaft/axles. Alternatively, an electric powered motor may be provided. The wheels or other ground-engaging portions 102 may be steerable in pairs or independently and the rotary mixer 100 may include front or rear steering, or both.

The suspension system 104 may support the frame 106 relative to the ground-engaging portion 102. In one or more embodiments, the suspension system 104 may include an adjustment mechanism 114, shown in FIG. 4, configured to control the position between a wheel or other ground-engaging portion 102 and a respective portion of the frame 106. The adjustment mechanism 114 may include, for example, an extendable leg, such as a telescopic leg or a lever arm, a scissor lift, or other adjustment mechanism may be provided. The adjustment mechanism 114 may allow for a flexible position of the ground-engaging portion 102 relative to the frame 106. However, and unlike many suspension systems, the position of the ground-engaging portion 102 relative to the frame 106 may be precisely controlled and secured.

Figure 4:
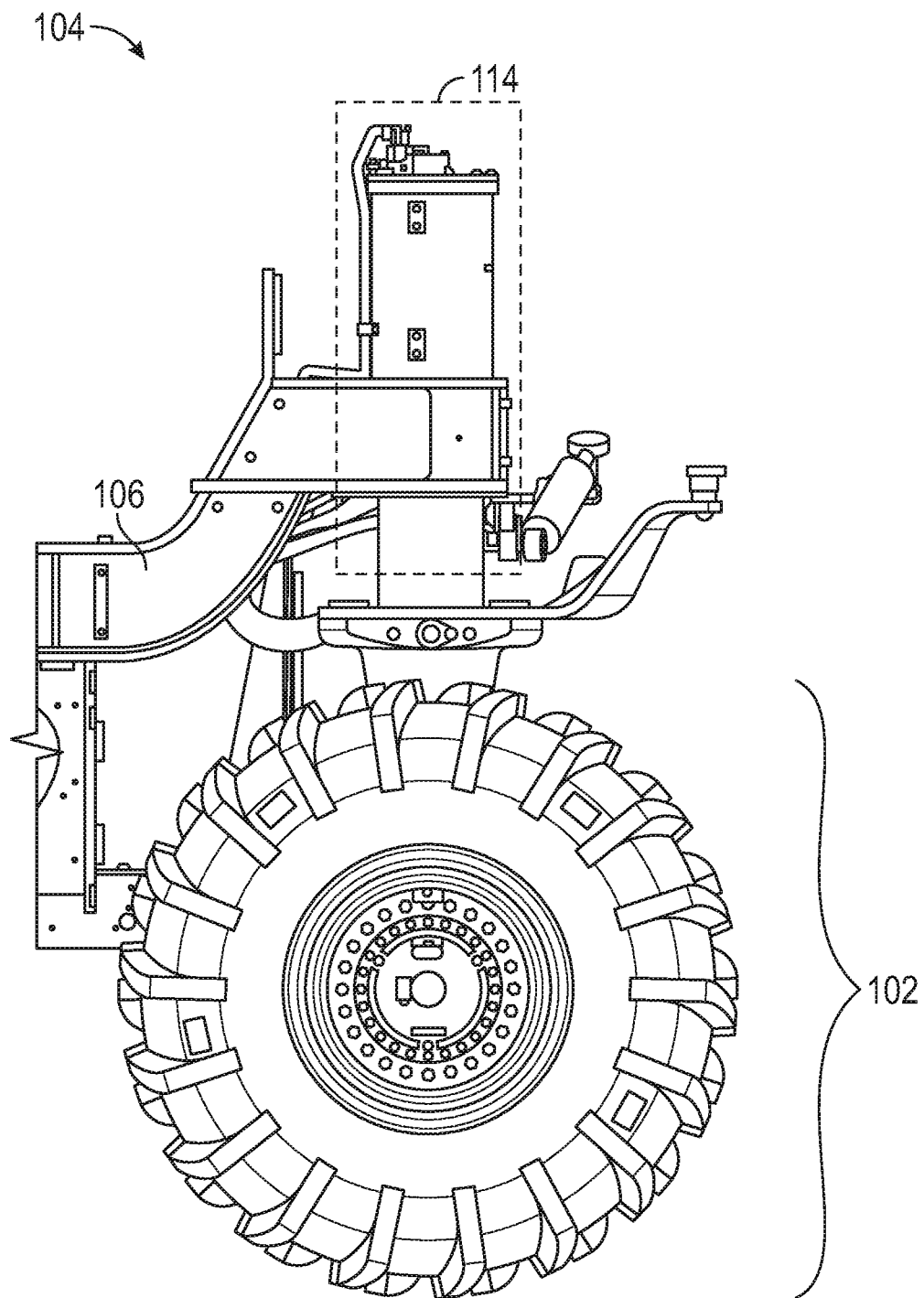
FIG. 4 is a close-up side view of a ground-engaging portion and suspension system, according to one or more embodiments.

In one or more embodiments, as shown in FIG. 4, the flexible and controllable adjustment mechanism 114 may include a telescopic leg. The telescopic leg may include a hydraulically controlled leg allowing the leg to be precisely extended or withdrawn by the operator. The telescopic leg may be in fluid communication with a hydraulic pump and valving system allowing for delivery of pressurized hydraulic fluid to the leg to lengthen or shorten the leg and, as such, push the ground-engaging portion 102 away or draw the ground-engaging portion 102 closer to the frame 106. The leg may be equipped with sensors allowing the amount of extension of the leg to be monitored or determined as the leg is extended. The valving system may allow the leg to be positioned using the hydraulic pressure and then held in position by closing the valves and securing the hydraulic position of the leg. This may provide for a substantially rigid and precisely controlled position of the wheel relative to the frame 106. The hydraulic system of the several wheels may be part of a single hydraulic system for the rotary mixer 100 relying on, for example, a centralized pressure reservoir. However, valving and other controls may allow for independent or grouped control of the legs. In one or more embodiments, the rotary mixer 100 may include a single leg corresponding to each ground-engaging device or wheel, for example. In other embodiments, multiple legs per wheel may be provided or, alternatively, less than one leg per wheel may be provided, such as one leg per pair of wheels, for example.

The suspension system 104 may allow for rigid control of the wheel positions relative to the frame 106. However, in one or more embodiments, the system 104 may be set to float, where, for example, the legs would be allowed to extend or retract based on the contour of the terrain. This may be useful, for example, when the machine is in a travel condition with the rotor 108 lifted away from the ground. In float mode with the machine at the travel position, the legs/cylinders may function more like a shock absorbing suspension system, which may be better for the machine and the operator during transport of the machine from one location on a project to another, such as when travelling from a haul position to a work position, for example.

The frame 106 may be configured to span between the several portions of the suspension system 104, support the operator and the controls of the rotary mixer 100 as well as provide a structure for supporting the rotor 108. The frame 106 may include a tubular structure including longitudinally extending members, cross members, and/or diagonally extending or angled members. While tubular members have been mentioned, other structural shapes including plates, bars, channels, angle shapes, or other structural shapes may be provided. Moreover, the structural shapes may be rolled, bent, curved, or otherwise formed to accommodate particular aspects, components, and shapes of the rotary mixer 100. The frame 106 may include one of a litany of selected arrangements of members adapted for securing the suspension system 104, the rotor 108, the rotor housing 112, the power source, the hydraulic system, and other features. In one or more embodiments, the frame 106 may form a relatively strong bridge from the front suspension system 104 to the rear suspension system 104 and may include an archway there under for arrangement and support of the rotor 108 and the rotor housing 112.

Figure 5:
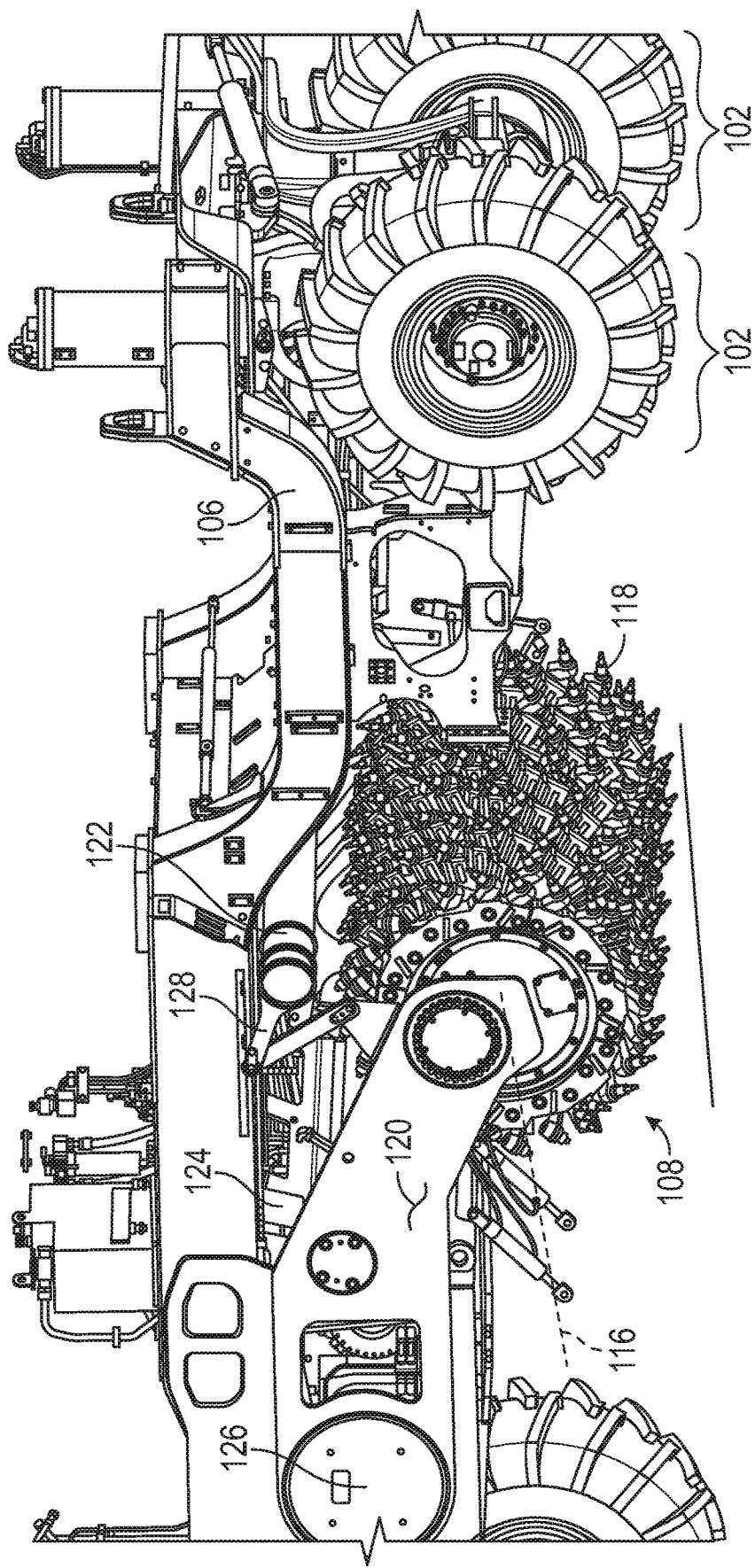
FIG. 5 is a perspective view of the rotary mixer of FIG. 1, with the mixer housing removed and showing the rotor position being canted relative to the ground surface, according to one or more embodiments.

As shown in FIG. 3, and in closer view in FIG. 5, the rotor 108 may be suspended from the frame 106 and may be adapted to cut, mix, or otherwise process a top layer of material arranged beneath the rotary mixer 100. The rotor 108 may include a generally cylindrical can or drum arranged with an axis 116 extending generally across the mixer 100, between the front and rear ground-engaging portions 102, and below the frame 106. The can or drum may be arranged on an axle or other spindle adapted for support at each end and also adapted for powered rotation of the rotor 108.

The rotor 108 may include teeth, blades, spurs, or other cutting elements 118 arranged on a surface or other outer facing portion of the can or drum. The cutting elements 118 may be particularly adapted to cut, shave, and mix material below the mixer 100. The cutting elements 118 may be particularly well suited for cutting, shaving, and/or mixing existing pavements, soil, gravel, rock, or other relatively hard surfaces. As such, the angle of attack of the cutting elements 118 may be precisely controlled or determined and each individual cutting element may be adapted for particular purposes relative to the group of cutting elements 118. Some cutting elements 118 may include carbide or other relatively hard materials and may be adapted for primary cutting, while other cutting elements 118 may include other materials and may be better adapted for mixing. The cutting elements 118 may be arranged such that they are each individually successful in cutting material, and the cutting elements 118 as a whole may be arranged to mix the material and avoid caking or otherwise collecting on the rotor 108. In one or more embodiments, the full width or substantially the full width of the rotor 108 may include cutting elements 118 adapted to contact the ground, and the elements 118 may be staggered such that particular elements are contacting the ground at any given time, while others are not, as the rotor 108 rotates.

As shown in FIG. 3 and in more detail in FIG. 5, the rotor 108 may be supported and controlled by a rotor support system 110. The support system 110 may include a rotor control lever 120 and a torsion bar 122. The control lever 120 may be configured to support and control the position of the rotor 108, while the torsion bar 122 may function to provide supplemental support of the rotor 108. The control lever 120 may include a pair of arms each pivotally supported by the frame 106 and extending along respective sides of the rotor 108. The arms may be adapted to operably engage the ends of the axle of the rotor 108, thereby supporting the rotor 108 and allowing the rotor 108 to rotate. Power to drive the rotor 108 may be provided along one or both of the control arms via a drive axle or other power source.

The control lever 120 may include a cross member configured for engagement by a hydraulic cylinder or other actuation device 124. The cross member may be arranged between the pair of arms at a point between the pivoting connection of the arms to the frame 106 and the rotor 108. The hydraulic cylinder may, thus, control the pivoted position of the pair of arms and, as such, the position of the rotor 108 relative to the frame 106 of the mixer 100. In one or more embodiments, the hydraulic cylinder or other actuation device 124 may include multiple hydraulic cylinders. In one or more embodiments, the cross member may be omitted and each arm of the control lever 120 may include a hydraulic cylinder connected directly thereto. In one or more embodiments, lateral tipping of the rotor 108 may be avoided and synchronous motion of the control arms may be provided. This may occur by structurally forcing synchronous motion (i.e., by tying the two arms together structurally) or by controlling respective hydraulic cylinders in a synchronous fashion.

Figure 6:
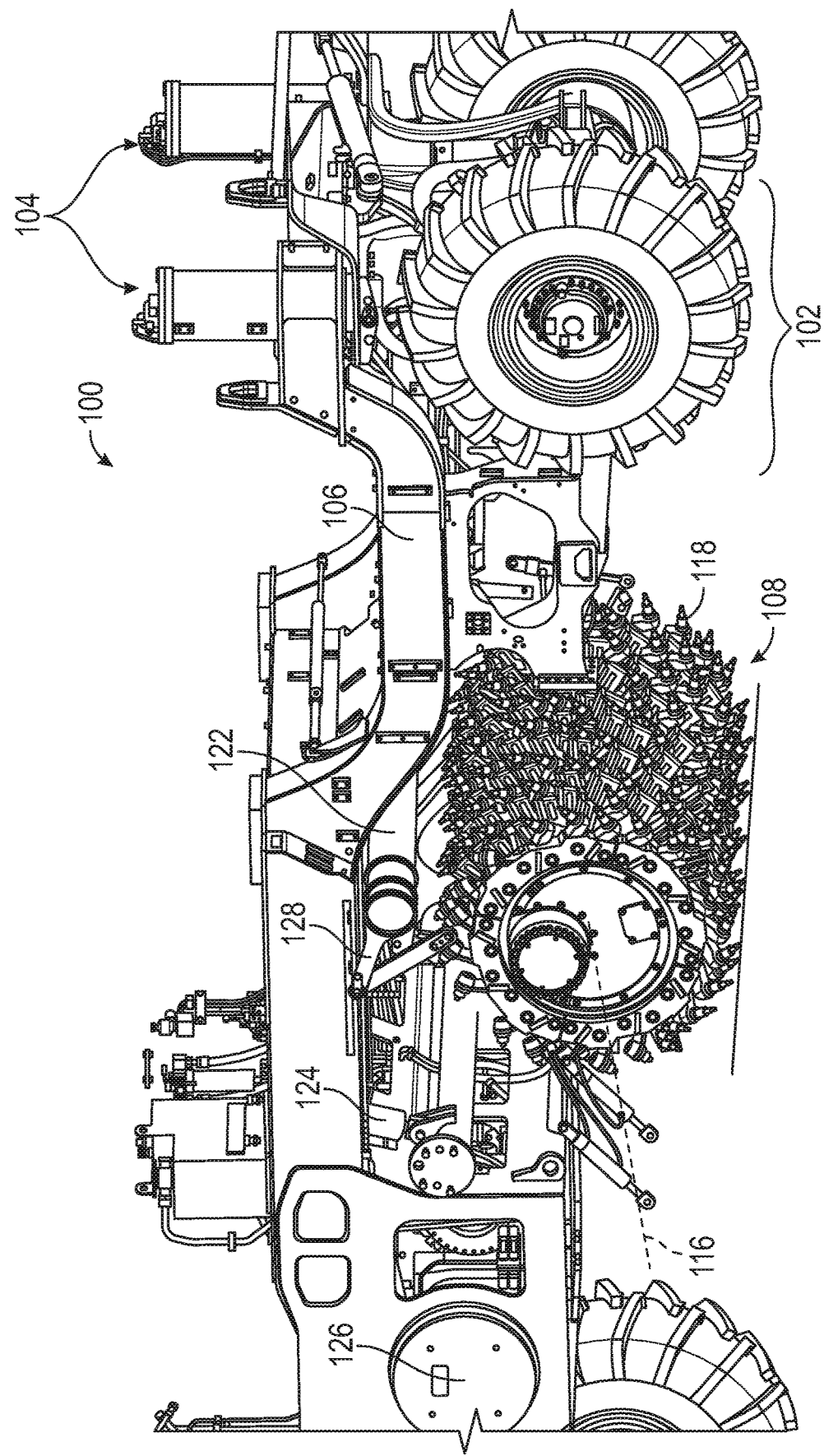
FIG. 6 is a perspective view of the rotary mixer of FIG. 4 showing the rotor in an actual scratch position, according to one or more embodiments.

As may be appreciated from a review of FIGS. 3, 5, and 6, the control lever 120 may be adjusted hydraulically to pivot the control arms about their pivot points 126 and, thus, control the position of the rotor 108 relative to the frame 106. The torsion bar 122 may be in place and connected to the rotor 108 to offset the weight of the rotor 108, allowing the control lever 120 to precisely control the position of the rotor 108 and reducing the effect of the rotor weight on the control lever 120. In one or more embodiments, the torsion bar 122 may be arranged generally parallel to the rotor 108 and between the rotor 108 and the frame 106. The ends of the torsion bar 122 may include linkages 128 at each end connecting the ends of the torsion bar 122 to the rotor 108. The torsion bar 122 may be supported by brackets off of the frame 106 and may generally resist differential rotation at each of its ends. As such, the weight of the rotor 108 may induce a bending moment in the linkages on each end thereof, causing torsion in the torsion bar 122, which the torsion bar 122 resists. The linkages on opposing ends of the torsion bar 122 may be arranged to induce equal and opposite torsion forces in the torsion bar 122. The torsion bar 122 and linkages may, thus, function as a force resisting spring.

Due to the aggressive interaction between the rotor 108 and the ground, particles or debris may fly from the rotor 108 and may not be contained as desired. This flying debris may also be a hazard to workers or personnel operating the mixer 100. Accordingly, a rotor housing 112 may be provided to contain the debris and allow for the debris to be maintained at or around the rotor 108 to allow for further mixing. The rotor housing 112 may include a plate steel or other separation members forming a housing around the rotor 108 on the front, rear, and sides of the rotor 108. In one or more embodiments, the housing 112 may surround the rotor 108 as mentioned, but it may be supported by the frame 106 so as to avoid imparting additional load on the control levers 120. Moreover, supporting the housing from the frame 106 may be well suited for machines having adjustability for cross slope. However, and alternatively, the housing 112 may be supported by the control levers 120 of the rotor support system so as to move with the rotor 108 as the rotor is adjusted upward and downward relative to the frame 106, while also being supported by the ground when the housing 112 contacts the ground.

The housing 112 may also include a ground guard 130 adapted to generally continuously engage the ground so as to seal off the working area of the rotor 108. The ground guard 130 may, for example, be arranged like a skirt on a bottom edge of the housing 112. The ground guard 130 may include skids or skis on a bottom edge thereof that engage the ground and support the guard 130 relative to the ground. The ground guard 130 may be slidably supported by the housing 112, such that the ground guard 130 may move up and down relative to the housing 112nsubstantially independent of the housing 112 position. For example, as shown in FIGS. 1 and 2, the ground guard 130 may be secured to the housing 112 with a bar extending outward to a cleat or plate. The ground guard 130 may include a sliding slot 132 for slidably engaging the bar and allowing the ground guard 130 to articulate upward and downward as the housing 112 gets closer and further away from the ground respectively. In this way, so long as the range of motion of the ground guard 130 is not exceeded, the ground guard 130 helps to ensure that generally continuous contact with the ground is made to seal the rotor working area.

Figure 7:
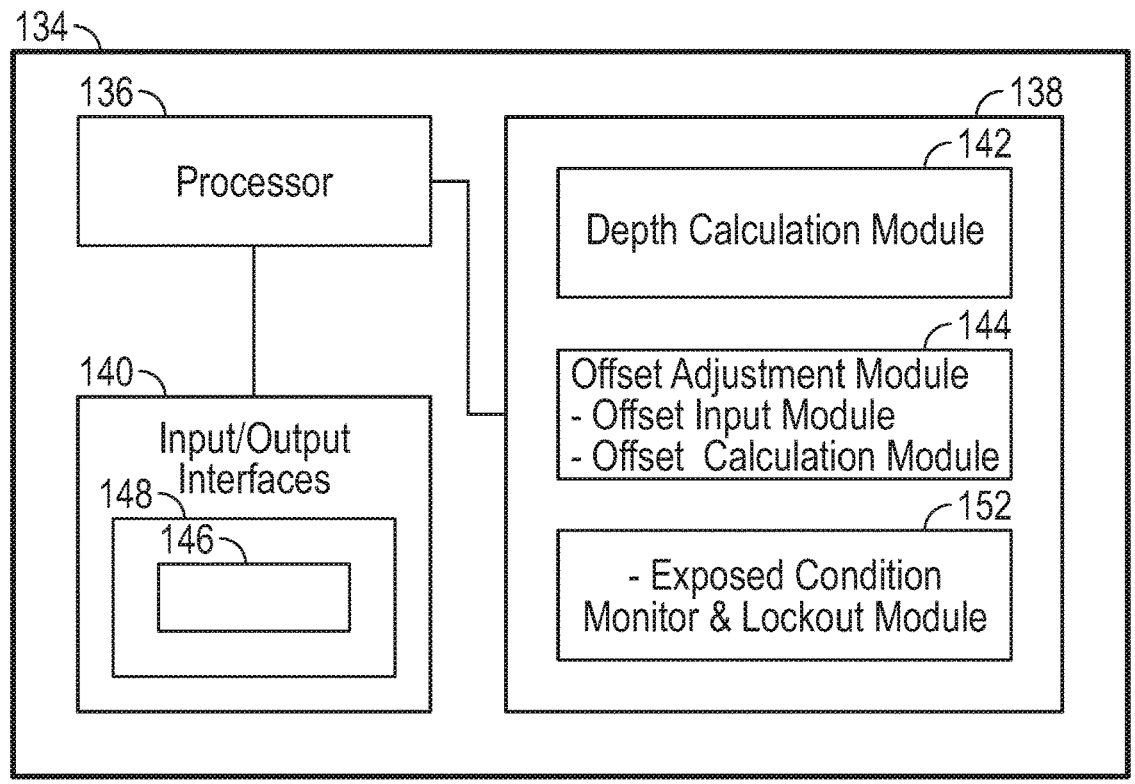
FIG. 7 is a schematic diagram of a control module, according to one or more embodiments.
Figure 8:
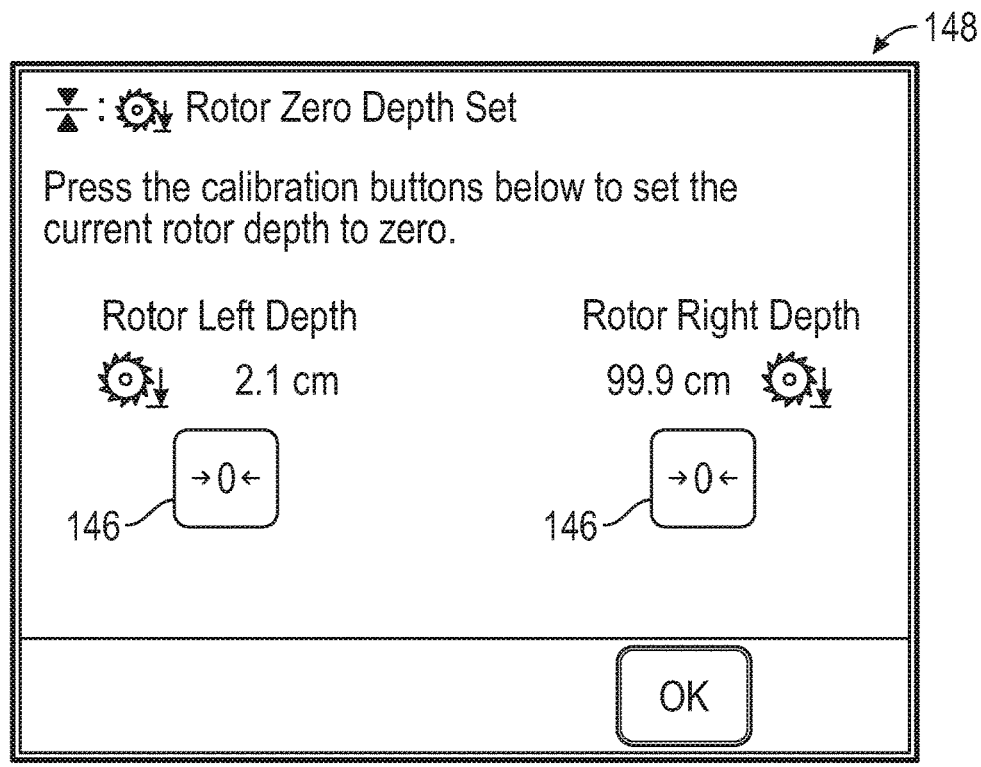
FIG. 8 is a view of an adjustment capture interface, according to one or more embodiments.

In addition to the various components that affect rotor depth, a control and monitor system or control module 134 may be provided to determine and/or control the rotor depth. That is, as shown in FIG. 1 and in more detail in FIG. 7, the rotary mixer 100 or other implement may include a control module 134 including a computing device equipped with a power source, a processor 136, a computer-readable storage medium 138, and one or a series of user interfaces 140 including one or more of a key pad, a touch screen, a monitor, a joystick, a mouse, and/or other inputs/outputs. The control module 134 may include software or instructions stored in the computer-readable storage medium 138 for processing by the processor 136 to control the mixer 100. One or more particularly adapted modules may be provided as part of the control module 134 and may include software, hardware, or a combination thereof. For example, in one or more embodiments, a depth calculation module 142 may be provided for determining the nominal rotor depth and/or a more accurate or actual rotor depth relying on an offset adjustment. The depth calculation module 142 may, thus, include software and/or instructions to calculate and control the rotor position relative to the ground. In addition, and for purposes of determining the more accurate or actual rotor depth mentioned, an offset adjustment module 144 may be provided for capturing and adjusting the rotor depth based on factors that are not readily ascertainable. In one or more embodiments, as shown in FIGS. 7 and 8, an adjustment capture module 146 may be provided for capturing one or more adjustment offsets for the rotor or tool depth. The adjustment capture module 146 may cooperate with the offset adjustment module 144 and the depth calculation module 142 to allow the operator to more readily appreciate the rotor depth relative to the ground. In one or more embodiments, as shown in FIG. 8, the adjustment capture module 146 may be provided in conjunction with a depth gauge 148 showing the operator the rotor position relative to the ground.

More particularly, the control module 134 may be relied on to process the software or instructions on the computer-readable storage medium 138 to adjust the rotor position relative to the ground, establish a scratch position, and adjust the rotor from the scratch position to a desired depth of cut or depth of mixing/processing. The software or instructions on the computing device may account for a series of ascertainable factors affecting the rotor position. In one or more embodiments, the system may include an offset adjustment to account for other factors not readily ascertainable and not incorporated into the system calculations. The offset adjustment may be different for each side of the rotor and, as such, independent offset adjustments for each side of the rotor may be provided.

In one or more embodiments, the depth calculation module 142 may add several dimensions to establish a frame height for each side of the machine (e.g., the rotary mixer 100). Since the rotor height is adjustable relative to the frame by pivoting the control lever about a pivot point, the frame height may be established at the pivot point of the control lever. From these respective heights (i.e., a height for each side of the frame at the pivot points), the system may subtract several dimensions to establish a rotor height for each side of the rotor. Aside from factors that affect rotor height that are not readily ascertainable (i.e., assuming these factors do not appreciably affect the rotor height, which may not always be the case), the calculations may be used to establish a nominal scratch position and a depth of cut of the rotor.

More particularly, for example, the depth calculation module 142 may have information regarding wheel size, rim size, tire size, and tire pressure in addition to overall vehicle weight. The system may use these dimensions and information to establish an overall diameter of the wheel system and may incorporate tire sag under load to establish the center point of the wheel above the ground surface. The center point of the wheel may have a known offset from the frame based on the suspension system and adjustments in the suspension system may be used to establish heights of the frame at each of the leg positions of the vehicle. Given the several frame positions, the height of the frame at each pivot point of the control lever may be established using slope information relating the several frame positions at the legs. For example, side-to-side slopes may exist as well as front-to-back slopes, and the height of the pivot point for each side of the control lever may be impacted by these slopes. Offsets, steps, or other frame shape features may also be included. In one or more embodiments, a more sophisticated approach to this may be used including a finite element analysis taking into consideration deflections in the frame due to the forces imparted on the frame in addition to the frame positions at the legs. Still other mathematical models may be used. Further calculations may be used to establish the height of the rotor. For example, the control lever may pivot about a pivot axis extending through the two pivot points and, as such, the rotor position may travel along an arc as it moves closer to and further away from the ground. The angle of the control lever and its length may be used to establish a centerline position of the rotor relative to the pivot point axis. Moreover, the diameter of the rotor including the cutting elements may be used to establish the position of the bottom of the rotor. Given the respective left and right positions of the rotor, the nominal position of the rotor relative to the ground may be established by subtracting the distance from the pivot point to the bottom of the rotor from the height of the pivot point above the ground. The above steps and/or portions thereof may be used to establish a nominal scratch position for the rotor. It is to be appreciated that the relative position and orientation of the several components of the machine may be established using sensors to assess elongation, retraction, rotation, etc., and such sensors may be in communication with the control module 134 to provide positional information used in the calculations.

Moreover, and as mentioned, several other factors may affect the height of the rotor relative to the ground, and such factors may not be readily ascertainable. For example, the soil conditions (i.e., the softness or hardness of the soil) may affect how much the machine sinks into the soil during use. Moreover, the soil conditions may change as the machine travels along a working path, and adjustments may need to be made throughout a project. Other factors may include the effect of air pressure in the tires, wearing of components such as bearings or other components affecting spatial relationships or offsets between components. Still other factors may exist that are not readily ascertainable. In one example, a rotary mixer 100 may be used to cut into an existing roadway surface, and one side of the machine may be supported by the ground off the side of the pavement while the other side of the machine may be supported more near the center of the roadway and on the pavement. Accordingly, the side supported by the ground may sit lower than the side supported by the pavement due to the softness of the ground and/or due to elevation changes between the pavement and the ground.

To address these factors that are not readily ascertainable, the system may include an offset adjustment module 144. The offset adjustment module 144 may be used with respect to each side of the rotor to accommodate differences from one side of the machine to another. The offset adjustment may be established as described in more detail below and may be included in the calculations to more accurately establish a scratch position and/or a depth of cut of the rotor. That is, for example, where the calculated position results in a rotor position that is actually below the surface, the offset adjustment may be used to raise the rotor position that is understood to be at a scratch position. Where the calculated position results in a rotor position that is actually above the surface, the offset adjustment may be used to lower the rotor position that is understood to be at a scratch position.

With reference to FIGS. 5 and 6, in one or more embodiments, a control and visual inspection process may be used to establish and capture the offset adjustment. For example, the rotary mixer 100 or other implement may be delivered to a project site and offloaded for operation. The rotary mixer 100 or other implement may then be driven to and/or arranged in its working environment. In one or more embodiments, initial operation of the machine (e.g., the rotary mixer 100) may be conducted to allow the machine to settle into its operative position. That is, the vibrations and shaking of the machine may have an effect on its ride height relative to the ground, and initial operation may help to establish a baseline of its ride position. The rotor height may be calculated by the system, and the operator may adjust the rotor 108 to a nominal scratch position. For example, the operator may adjust the rotor 108 such that the cutting elements 118 of the rotor 108 are thought to be flush with the ground. However, this adjustment may be made without knowledge of several of the factors mentioned that are not readily ascertainable. Accordingly, while the machine may adjust the rotor 108 to a position it believes to be flush with ground, the rotor 108 may not actually be flush as shown in FIG. 5. To address this, the operator or support personnel may inspect the rotor 108 to determines its position relative to the ground. Where the rotor 108 is too deep or where the rotor 108 is above the ground, the operator may adjust the machine to place the rotor 108 flush with the ground as shown in FIG. 6.

For example, the operator may adjust the suspension legs to tip the machine from side to side, or the operator may adjust the suspension legs to tip the machine from front to back or adjust the height of the machine without tipping. Moreover, the control lever 120 may be used to adjust the height of the rotor 108 relative to the frame 106. The operator may manually make the adjustments and may use visual inspection or sensors to determine when each side of the rotor 108 is in contact with or flush with the ground. At that point, the adjustment capture module 146 of the system may be used to capture the position of the rotor 108 compared to its nominal position for each side of the rotor 108.

The system, and in particular, the offset adjustment module 144, may then incorporate the captured offset into the rotor position calculations performed by the depth calculation module 142 by adjusting the position of the rotor 108 upward or downward based on the adjustment to accommodate the factors that are not readily ascertainable. The adjustment capture module 146 of the system may be with respect to each side of the rotor 108 and, as such, may be used to accommodate side to side tipping of the machine using leg adjustments to tip the machine so as to provide a rotor 108 that operates generally parallel with the surface of the ground. As may be appreciated, the offset adjustment module 144 may provide a revised baseline based on actual in-field conditions, allowing the operator to more confidently rely on variations from the baseline. More particularly, by using the adjustment capture module 146, the depth gauge 148 may be reset to a depth of zero when the rotor 108 is at an actual scratch position. As such, variations above or below the zero point may more accurately reflect the rotor position relative to the ground surface taking the factors into account that are not readily ascertainable.

While effects of tire pressure have been said to not be readily ascertainable, particular knowledge of the tires being used and their response to pressure may allow for incorporation of tire pressure into the nominal rotor position. That is, given the relatively fine measurements associated with the depth of cut of the rotary mixer 100 and the size of the tires, the tire inflation may be a factor to consider when estimating or calculating the rotor position. Accordingly, tire pressure may be monitored on a continuous or periodic basis such that changes in tire pressure from temperature fluctuations or other factors affecting tire pressure may be addressed. In one or more embodiments, an adjustment table may be established for a particular tire where, for example, a range of tire pressures may be associated with a range of height adjustments for the machine. Where the tire pressure is at a design pressure or expected pressure, the adjustment may be zero. However, where the tire pressure is above the design pressure, the machine may be adjusted down (i.e., closer to the ground or other supporting surface) to compensate for an elevation of the machine. In contrast, where the tire pressure is low, the machine may be adjusted upward (i.e., further from the ground or other supporting surface) to compensate for overly sagging tires. Each of the tires may be monitored independently and may be compensated for by adjusting its associated leg or other suspension system 104. In one or more embodiments, each leg may be independently adjustable. In other embodiments, some of the legs may be independently adjustable and other legs may be adjustable in pairs. For example, in one or more embodiments, the front legs may be independently adjustable and the back legs may be adjustable as a pair.

In one or more embodiments, tables of axle height to tire pressure may be established using modeling or empirical techniques such that measurements of tire pressure may be used to more accurately establish the axle height of an axle supported by the wheel.

In one or more embodiments, the system may include a process of receiving tire pressure input and adjusting the height of the frame 106 at the respective wheel according to the tire pressure by looking up an offset value in a table or otherwise incorporating tire pressure into the frame height at a respective wheel.

Figure 9:
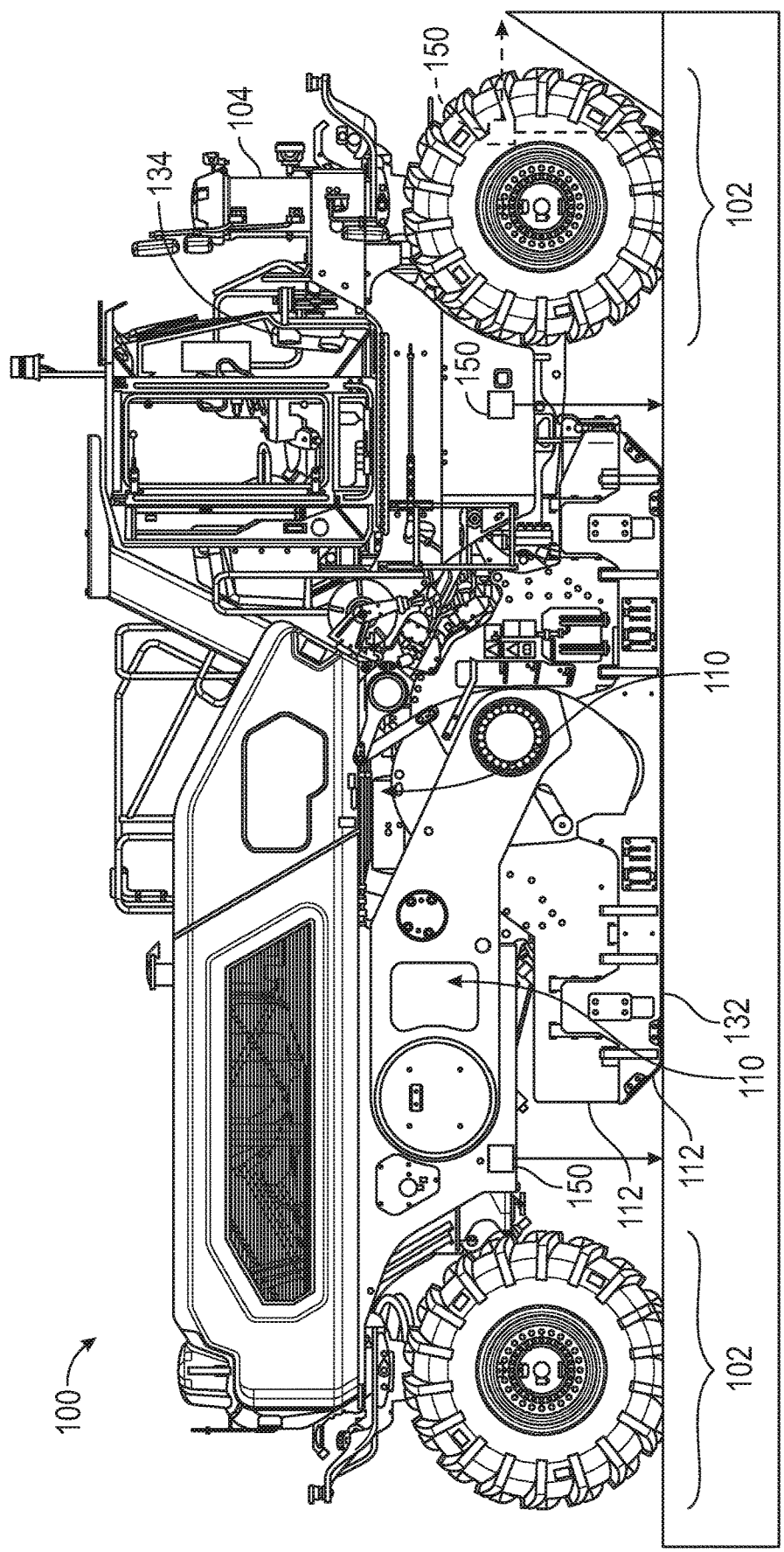
FIG. 9 is a side view of the rotary mixer of FIG. 1 including sensors, according to one or more embodiments.

While a visual inspection approach to establishing the offset adjustment has been mentioned, in one or more embodiments, a more automated or sensor-based approach may be used. This sensor approach may be used in addition to or as an alternative to the visual inspection approach mentioned above. As shown in FIG. 9, the machine or implement (e.g., the rotary mixer 100) may include one or a plurality of sensors 150 that may be arranged on or about the machine or implement that are configured for sensing surrounding environmental features. For example, and as shown, sensors 150 may be provided on each of a left side and a right side of the mixer 100 and on a front of the mixer 100. In one or more embodiments, the right side sensor may include a front sensor and a rear sensor where the front sensor is in front of the rotor 108 and the rear sensor is in back of the rotor 108. Still other sensors may be provided on a bottom of the mixer 100, on a rear side of the mixer 100, or on other surfaces. In one or more embodiments, the sensors 150 may be provided in locations less apt to get dirty or otherwise develop interference and, as such, the sensors 150 may be arranged relatively high on the machine as opposed to at or near the ground surface. The sensors 150 may be directed downward and may be adapted to measure a distance between their respective mount positions and the ground. One or more sensors 150 may be directed outward toward an area in front of the machine, outward toward one or more areas to the sides of the machine, and/or downward and outward at an angle, for example. The sensors 150 may be adapted to gather information about the ground surface relative to the machine to allow for more accurately determining a scratch position for the rotor 108.

The sensors 150 may be adapted to sense distance or other factors. In one or more embodiments, the sensors 150 may include cameras, sonic sensors, lasers, or other distance measuring sensors or devices. The sensors 150 may be in electrical and data communication with the control module 134 and may be adapted to collect and transmit distance data to the control module 134 for use in determining the rotor depth or other operations. The sensors 150 may be identifiable by the control module 134 relative to one another, and the location and relative positions of the several sensors 150 may be known and stored in the system. As such, the distance measurements from each sensor 150 may be associated with a location on the frame 106.

The sensors 150 may be adapted to provide an additional input into the depth calculation module 142, which may augment or override other assumed values, for example. In one or more embodiments, the sensors 150 may be used to establish the position of the frame 106 of the machine relative to the surface of the ground surface at the sensor locations. This approach may allow for eliminating unknown factors or factors that are not readily ascertainable. For example, the effects of tire pressure, soft soils, uneven ground, or other factors can affect the position of the frame 106 relative to the ground and, as such, make it difficult to calculate the actual scratch position of the rotor 108. The sensors 150 may be used to directly measure the distance between the frame 106 and the ground at respective locations, thereby allowing for a determination of the frame position (i.e., height and orientation) relative to the surface of the ground without needing information about soil softness, tire sag, etc. In one or more embodiments, three sensors 150 may be used so as to define a plane and allow for determination of the position of other portions of the frame 106.

Using the sensors 150, the system may identify the frame position relative to the ground and may, thus, be able to determine the position of the pivot points 126 or other support points of the rotor 108 relative to the ground. With further information regarding the rotor position based on the lever arm angle, the lever arm length, and the rotor geometry, the position of the rotor 108 relative the ground may be established. It is to be appreciated that inconsistencies in the ground surface between the several sensors 150 may cause errors in the determination of the rotor position relative to the ground, and visual inspection may still provide for a slightly more accurate determination of rotor position. However, using the sensors 150, several factors that are not readily ascertainable may be eliminated, or the effects of those factors may be reduced, allowing for an ability to more accurately determine the rotor position. In one or more embodiments, using the sensors 150 may provide for a more accurate nominal scratch position. In some cases, an operator may still move the rotor 108 from this more accurate nominal scratch position to an actual scratch position and may use visual inspection to establish the actual scratch position. The user may also continue to use the offset adjustment module 144 to include an offset adjustment above and beyond the accurate nominal scratch position already established.

Figure 10:
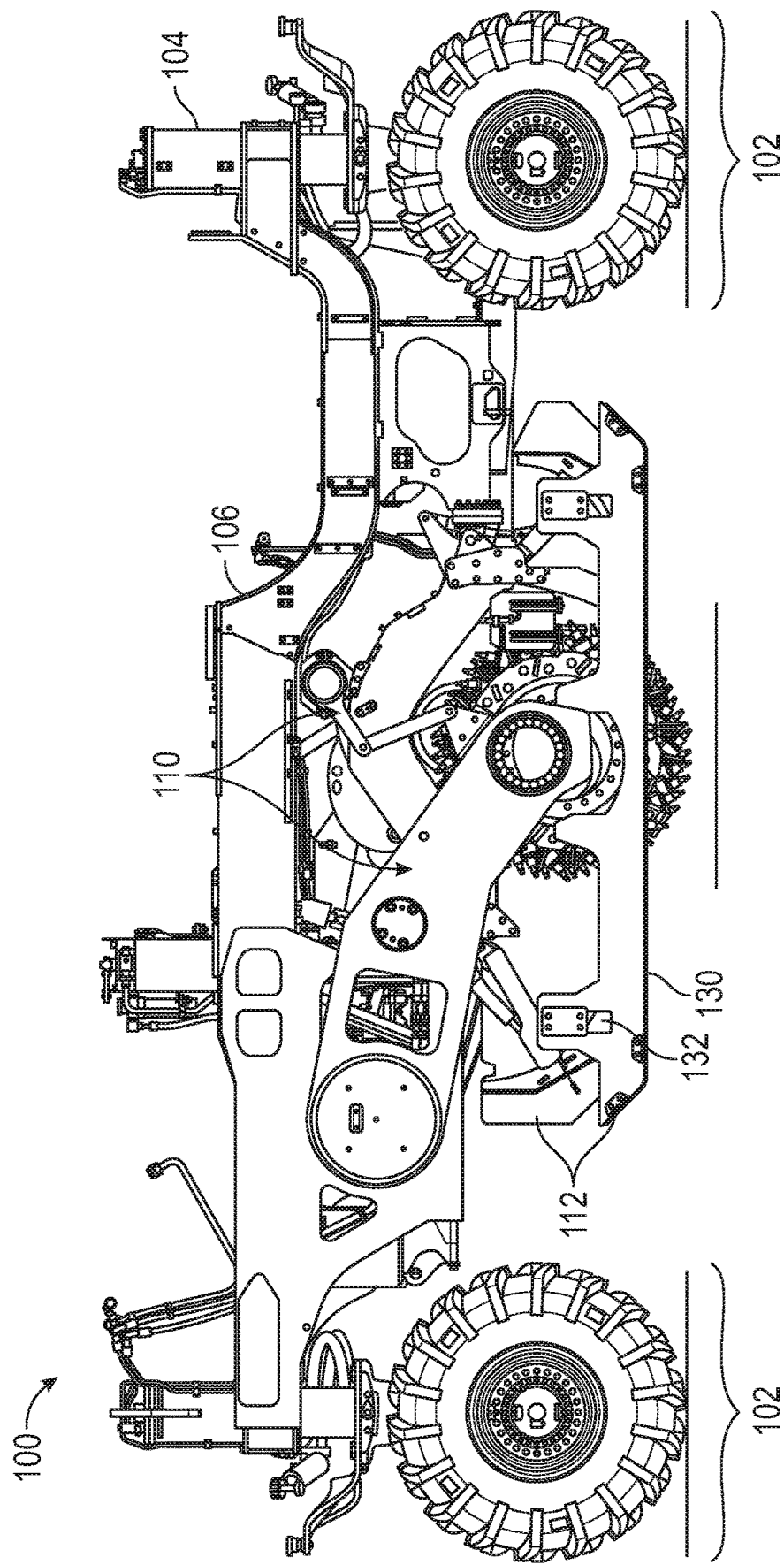
FIG. 10 is a side view of the rotary mixer of FIG. 1 with a rotor in an exposed condition, according to one or more embodiments.

In addition to systems for accurately determining the position of the rotor 108 relative to the ground, the control module 134 may also include systems and methods for monitoring the position of the rotor 108 and for managing exposed conditions. For example, in some circumstances, the housing 112 and its ground guard 130 may lose contact with the ground such as when the legs of the mixer 100 are extended relatively high as shown in FIG. 10. This may be useful for allowing the mixer 100 to travel without having the housing 112 touching the ground, for example. However, when this condition exists and the rotor 108 is below the bottom of the housing 112, as also shown in FIG. 10, the rotor 108 may be exposed, which can be a dangerous condition. In other situations, the exposed condition may occur during operation, which can cause flying debris, which can be dangerous for ground personnel.

For purposes of understanding the various positions of the housing 112 and rotor 108, there may be seven or so conditions to consider. The first three of these seven conditions may occur when the legs of the rotary mixer 100 are arranged such that the housing 112 and/or ground guard 130 is in contact with the ground. In that condition, the rotor 108 may be arranged above the ground as shown in FIGS. 1-3, at a scratch position, or below the ground such as when the rotor 108 is working the ground. Where the legs of the mixer 100 are further extended, the housing 112 and ground guard 130 may get lifted off the ground. In this condition, the rotor 108 may be arranged fully within the housing 112 and above the ground surface. When the rotor 108 is below the housing 112 and ground guard 130, the rotor 108 may still be above the ground, or it may be at a scratch position, or the rotor 108 may be below the ground surface. In FIG. 10, the rotor 108 is below the housing 112, but above the ground. Any and/or all of the conditions where the rotor 108 is below the housing 112 and ground guard 130 may be dangerous conditions because exposure to the rotor 108 itself can be dangerous due to the moving cutting elements 118. Moreover, while one side of the rotor 108 may be above the ground, the other side may not and laterally moving or flying debris may be expelled out below the lifted housing 112. Still further, where the rotor 108 is at a scratch position or in the ground, the rotor 108 may throw debris that could hurt or injure personnel or cause other damage. In one or more embodiments, the present system may identify when the rotor 108 is exposed below the housing 112 and above the ground.

For purposes of identifying and managing exposed conditions of the rotor 108, the control and monitoring system or control module 134 may include an exposed condition monitor and a lockout module 152, illustrated in FIG. 7. The exposed condition monitor may be configured to determine when the rotor 108 is exposed by determining the rotor position relative to the ground and determining the rotor position relative to the housing 112 and ground guard 130. The lockout module 152 may be configured to manage the condition by locking out the rotor 108 or notifying personnel of a dangerous condition.

The exposed condition monitor may determine the rotor position relative to the housing 112 and ground guard 130 based on machine geometry. For example, and as mentioned, the housing 112 may be secured to the frame 106 of the machine and may have a defined geometry, so the position of the bottom of the housing 112 relative to the frame 106 may be a stationary position. However, and as mentioned, the ground guard 130 may float upward and downward relative to the housing 112. That is, the ground guard 130 may include a bar that articulates in a slot allowing the ground guard 130 to accommodate changing ground elevations relative to the housing 112. For purposes of ascertaining an exposed condition, the exposed condition monitor and lockout module 152 may calculate the lowest most point of the ground guard 130 such as when the bar has translated fully downward in the slot allowing the ground guard 130 to arrive at its lowest point. It is noted that this assumes that the ground guard 130 has not gotten stuck or hung up on the housing 112. In one or more embodiments, sensors 150 may be provided for confirming the free motion of the ground guard 130; where the ground guard 130 is hung up, the calculations of the bottom edge of the ground guard 130 may account for a higher position.

The position of the rotor 108 relative to the frame 106 and, thus, relative to the bottom elevation of the housing 112 may be calculated using portions of the steps used to determine the rotor position relative to the ground. That is, given that the rotor 108 is supported by the frame 106, the rotor position may be determined based on the angle of the control lever 120 and the length of the lever or other supporting structure of the rotor 108. With geometry information regarding the rotor 108, such as a diameter including the cutting elements 118, the position of the bottom edge of the rotor 108 may be determined relative to the frame 106 and compared to the bottom edge of the housing 112 and ground guard 130. Where the rotor 108 is below the housing 112, this may be one factor in identifying whether the rotor 108 is in an exposed condition.

The exposed condition monitor and lockout module 152 may also determine whether the rotor 108 is above a scratch position. The exposed condition monitor and lockout module 152 may rely on the depth calculation module 142 to determine the rotor position relative to the ground. As described above, the depth calculation module 142 may be configured for determining a nominal scratch position or a more accurate nominal scratch position using ground sensors. As also described, the system may be capable of establishing an actual scratch position using an adjustment offset. Any of these approaches may be an estimate of the ground position, and the position of the rotor 108 may be compared to one or more of these positions to determine if the rotor 108 is above the ground, at a scratch position, or in the ground. In one or more embodiments, for example, where a nominal scratch position is used, some amount of error may be assumed for purposes of more conservatively identifying an exposed condition.

Where the exposed condition monitor and lockout module 152 determines that the rotor 108 is below the housing 112 and ground guard 130 and above the ground as shown in FIG. 10, the exposed condition monitor may trigger the lockout module 152. The lockout module 152 may manage the exposed condition in two modes: operating mode and idle mode. That is, the lockout monitor may assess whether the rotor 108 is operating when the exposed condition occurs or whether the rotor 108 is idle when the exposed condition occurs and may respond accordingly.

In either case (i.e., operating or idle mode), the lockout module 152 may notify the operator by providing an indication on an interface 140 in the cab of the machine or otherwise in the vicinity of the operator. The notification may include a flashing light, a warning notice on a screen, a buzzer, another notification technique, and/or a combination of these notifications. Moreover, the notification may indicate to the operator which side of the machine is experiencing the exposed condition such that the operator may attend to remedying the condition.

In addition to notifying the operator, the lockout module 152 may take further actions depending on the operating condition of the machine. In the operating mode, the lockout module 152 may take measures to notify ground personnel or others outside or around the machine. In this mode, the lockout module 152 may allow the rotor 108 to continue to operate. In one or more embodiments, the lockout module 152 may include a timeframe for remedying the exposed condition and may lockout the rotor 108 if the exposed condition is not remedied within the timeframe. In the idle mode, the lockout module 152 may lockout the rotor 108 and prevent operation of the rotor 108 unless/until the exposed condition is remedied.

For purposes of notifying ground personnel or others, the rotary mixer 100 may include exterior alert features 154 including flashing lights as shown in FIG. 1, strobes, speakers, buzzers, beeping features, or other attention catching features for calling attention to the exposed condition. The alert features 154 may be arranged on the sides of the mixer 100 in view of ground personnel. In one or more embodiments, the lockout module 152 may trigger alerts on a side of a mixer 100 where the exposed condition has occurred or the lockout module 152 may trigger alerts on both or all sides of the mixer 100.

In one or more embodiments, the exposed condition monitor and lockout module 152 may attempt to avoid exposed conditions to begin with. That is, for example, in one or more embodiments, the exposed condition monitor may monitor the position of the housing 112 and ground guard 130. Where the exposed condition monitor determines that the ground guard is or is likely to be above the ground surface, lowering of the rotor 108 below the bottom of the ground guard may be prevented. This may prevent a user from inadvertently lowering the rotor into an exposed condition and, thus, avoid endangering ground personnel.

Figure 11:
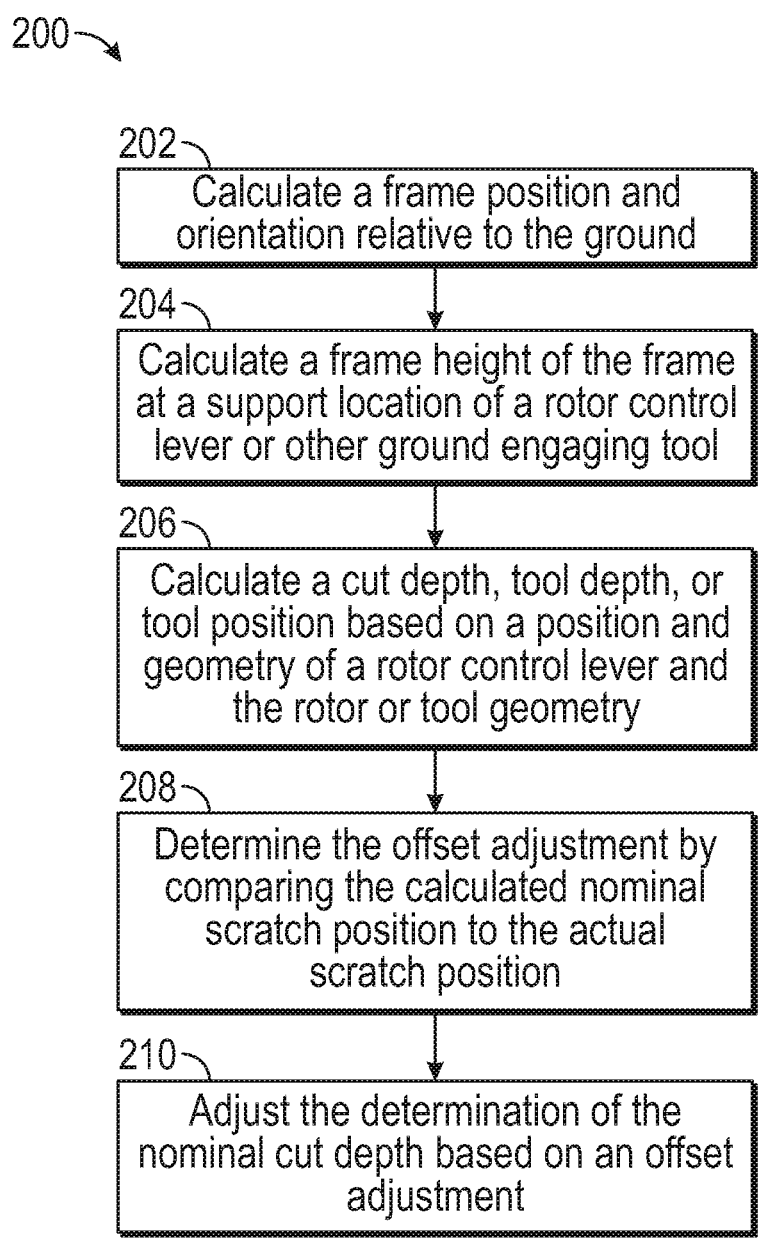
FIG. 11 is a diagram showing method operations performed by the control module to calculate a rotor position or depth.

In operation, the rotary mixer 100 or other implement may perform a method (200) of determining a rotor position or cut depth as shown in FIG. 11. The rotary mixer, and in particular, the control module thereof, may calculate a frame position or orientation above the ground (202). In one or more embodiments, this may be based on known machine geometry such as tire and rim size, tire inflation, suspension geometry, and other portions of the machine between the ground and the frame. In one or more other embodiments, the system may rely on distance sensor data from distance sensors to establish the frame position. That is, the control module may receive distance and/or distance and location data from one or a plurality of ground sensors. The system may analyze the several positions of the frame to establish an overall frame position. In either case, the system may also calculate a frame height of the frame at a support location of a rotor control lever or other ground engaging tool, for example (204). Still further, the system may calculate a cut depth, tool depth, or tool position based on a position and geometry of a rotor control lever and the rotor or tool geometry (206). Given the existence of factors that are not readily ascertainable, the system may adjust the determination of the nominal cut depth based on an offset adjustment (210).

The offset adjustment may include a distance between a nominal scratch position and an actual scratch position and may include an adjustment for the left and right sides of the machine. The offset adjustment may be established based on input from a user. For example, the operator may adjust the position of the rotor and rely on visual inspection to iteratively adjust the rotor until it is in an actual scratch position. The user may then depress a button or interact with an interface to inform the machine that the rotor is at an actual scratch position. The system may then determine the offset adjustment by comparing the calculated nominal scratch position to the actual scratch position (208). In one or more embodiments, the system may automatically adjust the rotor position relative to the ground surface based on knowledge of approaching slope changes. For example, the distance measurement devices may be used to track and store a ground profile as the rotary mixer propagates across the ground, allowing the rotor position to be adjusted as the ground changes.

Figure 12:
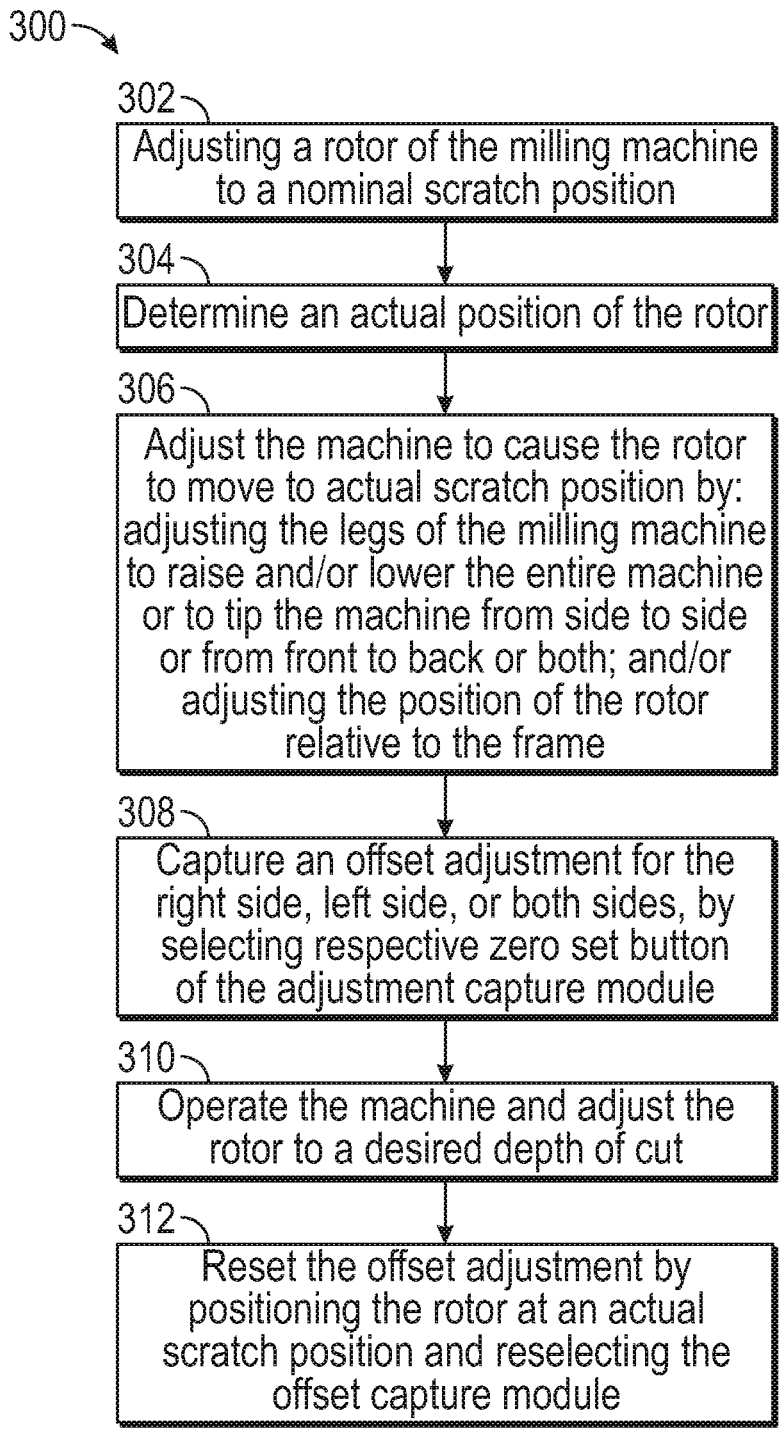
FIG. 12 is a diagram showing method operations performed by a user to adjust a rotor position and establish an actual scratch position.

From a user's perspective, a method (300) of operating a milling machine may include one or more of the steps shown in FIG. 12. For example, a user may adjust a rotor of the milling machine to a nominal scratch position (302). The user may adjust the rotor based on the depth gauge on the interface, while the system may rely on calculations based on machine geometry, distance sensors, or both. In either case, the user may then visually inspect or rely on sensors to determine an actual position of the rotor (304). Where the nominal scratch position of the rotor is not the same as an actual scratch position, the user may adjust the machine to cause the rotor to move to an actual scratch position (306). More particularly, the user may adjust the legs of the milling machine to raise and/or lower the entire machine or to tip the machine from side to side or from front to back or both. Still further, the position of the rotor relative to the frame may be adjusted. These adjustments may be iterative and may be made based on visual inspection of the rotor until the rotor is arranged at an actual scratch position. At that time, it may be appreciated that the depth gauge of the control module may reflect that the rotor is at a position that varies from the nominal scratch position. For example, the depth gauge may indicate that one side of the rotor is above scratch or that it is below scratch by some dimension. The other side of the rotor may also be shown to be above or below scratch by some dimension. Having adjusted the rotor from a nominal scratch position to an actual scratch position, the dimension shown on the depth gauge may be the offset adjustment between nominal scratch and actual scratch positions of the rotor. As such, the user may capture an offset adjustment by selecting the zero set buttons of the adjustment capture module (308). This may allow the system to capture the offset adjustment and use that adjustment going forward to accommodate factors that are not readily ascertainable. Selection of the capture module may reset the depth gauge to zero, allowing variations from the actual scratch position to be more readily appreciated by the user. It is to be appreciated that the user may capture the offset for the right and left sides of the machine to accommodate right to left variances. The user may operate the machine and may adjust the rotor to a desired depth of cut (310). Through the course of use, the soil conditions or other factors may change from time to time and the offset adjustment may be reset by positioning the rotor at an actual scratch position and reselecting the offset capture module (312).

It is to be appreciated that adjustment of the machine (306) may be used for purposes beyond controlling rotor depth. That is, for example, the user may adjust the machine legs to a selected height for purposes of having the chamber carried or held at a particular height above ground. In one or more embodiments, the chamber height may be positioned such that the ground guards engage the ground at the midpoint of their stroke. This selection may maximize and/or balance the available upward and downward motion of the ground guard and, as such, may help to avoid having the chamber hang up on the ground while also allowing for accommodation of low ground areas to avoid rotor exposure. In other examples, the user may select an upper ¾ point of the stroke of the ground guards to avoid exposure, but to provide more accommodations for high ground areas that may cause the chamber to hang up. Still other chamber positions may be selected by the user. Moreover, the sensors 150 may readily allow for this type of adjustment.

Figure 13:
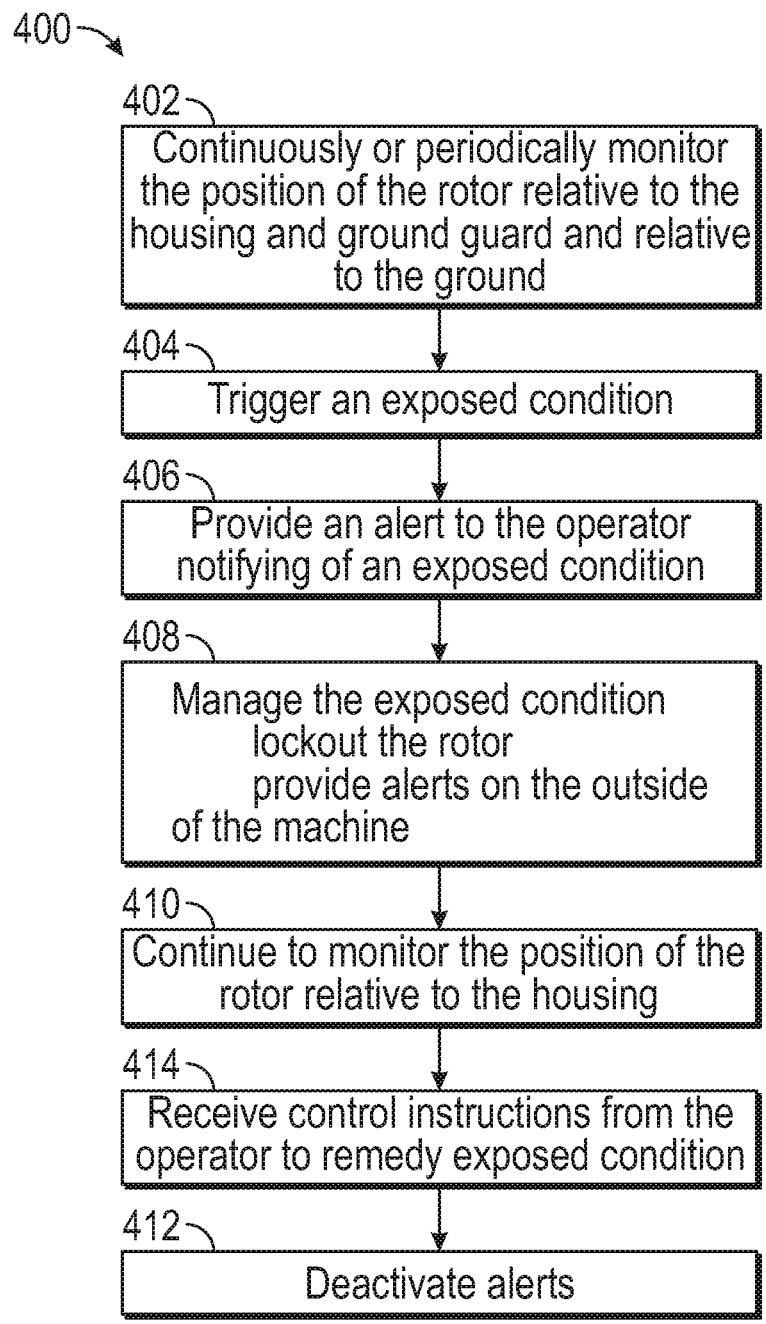
FIG. 13 is a diagram showing method operations performed by the control module to monitor and manage an exposed condition, according to one or more embodiments.

In operation, as shown in FIG. 13, the system may perform a method (400) of identifying and managing an exposed condition. The system may continuously or periodically monitor the position of the rotor relative to the housing and ground guard and relative to the ground (402). This may be performed for each of the left and right sides of the rotor. When the system identifies that the rotor is both below the housing ground guard and above the ground on one or more sides of the rotor, the system may trigger an exposed condition (404). The system may provide an alert to the operator notifying the user of an exposed condition (406) and may provide an indication of which side or sides of the machine have an exposed condition. Depending on the status of the rotor (i.e., operating or idle), the system may manage the exposed condition (408). Where the rotor is not operating, the system may lockout the rotor until the exposed condition is remedied. Where the rotor is operating, the system may provide alerts on the outside of the machine for ground personnel or other surrounding people. The system may continue to monitor the position of the rotor relative to the housing and the ground (410) and may deactivate the alerts to the operator, deactivate the lockout, and/or deactivate the alerts to ground personnel when the exposed condition is remedied (412). In one or more embodiments, the system may receive control instructions from the operator (414) that may adjust the legs of the machine to bring the housing back into contact with the ground and/or that may adjust the rotor upward within the housing. In still other situations, a combination of leg adjustments and rotor adjustments may be received from the operator.

Figure 14:
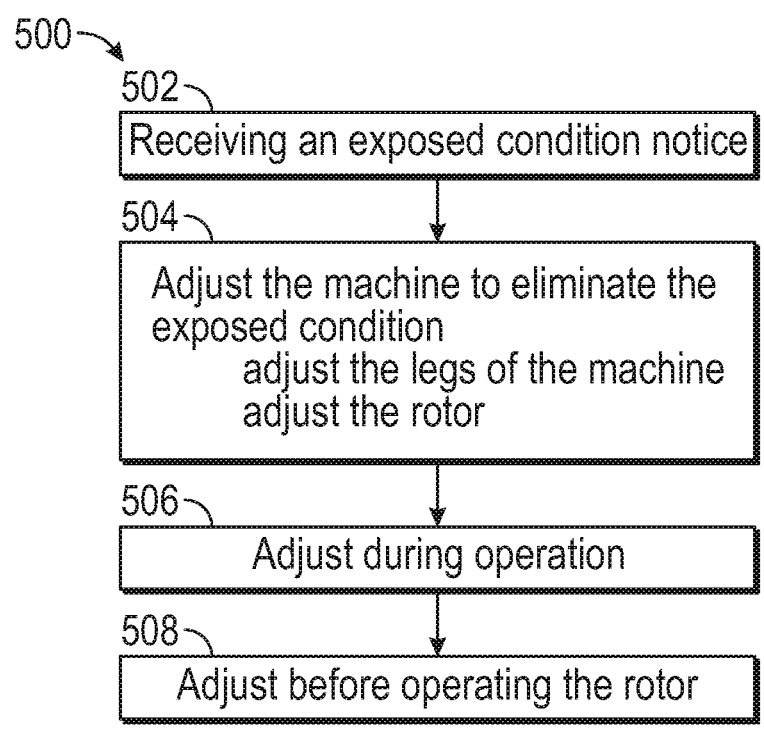
FIG. 14 is a diagram showing method operations performed by a user when encountering an exposed condition, according to one or more embodiments.

From a user's perspective, as shown in FIG. 14, a method (500) of operating an implement may include receiving an exposed condition notice (502). The operator may recognize which side of the machine is exposed either by inspection or due to the notice and may adjust the machine to eliminate the exposed condition (504). In one or more embodiments, the operator may adjust the legs of the machine to lower the housing or ground guard back into contact with the ground. This may include adjusting all of the legs to maintain the slope relationship of the rotor with respect to the ground, or one or more legs may be adjusted. In one or more embodiments, the rotor may be adjusted upward to bring the rotor within the housing or to account for the lowering of the legs and the machine. In one or more embodiments, the operator's efforts to remedy the exposed condition may be during operation (506) or, if the rotor was not already operating, the efforts may be performed before operating the rotor (508).

INDUSTRIAL APPLICABILITY

The present disclosure, in one or more embodiments, relates to devices, systems, and methods for identifying exposed conditions of a rotor of a rotary mixer and managing those conditions. The technology disclosed herein may allow for determining when the rotor is exposed and may address the exposed condition while helping to minimize or avoid unnecessary interruption. As such, the present disclosure may help to reduce injury from exposure to the rotor or flying debris. However, these efforts may be possible without unnecessarily interrupting operation of the equipment. As such, machine productivity may be maintained.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

What is claimed is:

1. An implement for working an existing ground surface, the implement comprising:
    a frame supported above the existing ground surface by a ground-engaging portion and a suspension;
    a tool supported by and adjustable relative to the frame and configured for working the existing ground surface down to a selected depth;
    a housing arranged around portions of the tool, secured to the frame, and having a bottom; and
    a monitor system configured for identifying an exposed condition of the tool, by:
        determining a first tool position relative to the existing ground surface; and
        determining a second tool position relative to the bottom of the housing, wherein the exposed condition comprises a tool position that is both above the existing ground surface and below the bottom of the housing.

2. The implement of claim 1, wherein the monitor system is configured for identifying a side of the implement having the exposed condition.

3. The implement of claim 1, wherein the monitor system further comprises a lockout module configured for performing lockout operations.

4. The implement of claim 3, wherein the lockout operations comprise triggering operator notifications.

5. The implement of claim 4, wherein the operator notifications include an indication of a side of the implement with the exposed condition.

6. The implement of claim 3, wherein the implement comprises alert features for ground personnel and the lockout operations comprise triggering ground personnel notifications.

7. The implement of claim 3, wherein the tool is a rotor and lockout operations include locking out the rotor if it is not already operating.

8. A method of managing an exposed condition of a ground-engaging tool configured for working an existing ground surface down to a particular depth, comprising:
    monitoring a position of the ground-engaging tool relative to the existing ground surface;
    monitoring a position of the ground-engaging tool relative to a bottom of a surrounding housing; and
    identifying an exposed condition when the ground-engaging tool is both below the bottom of the surrounding housing and above the existing ground surface.

9. The method of claim 8, further including triggering lockout operations when the exposed condition is identified.

10. The method of claim 9, wherein the lockout operations include notifying an operator.

11. The method of claim 9, wherein the lockout operations include triggering alert features for ground personnel.

12. The method of claim 9, wherein the lockout operations include locking out operation of the ground-engaging tool when the ground-engaging tool is not operating.

13. The method of claim 9, further comprising deactivating the lockout operations when either:
    the ground-engaging tool is no longer below the bottom of the surrounding housing; or
    the ground-engaging tool is no longer above the existing ground surface.

14. The method of claim 8, wherein monitoring the position of the ground-engaging tool relative to the existing ground surface is based on an actual scratch position of the ground-engaging tool.

15. A method of operating an implement with a ground-engaging tool configured for working an existing ground surface down to a selected depth, comprising:
    receiving a notification that the ground-engaging tool is in an exposed condition, the notification being based on:
        a determination of first tool position relative to the existing ground surface; and
        a determination of a second tool position relative to the housing, where the exposed condition comprises a ground-engaging tool position that is both above an existing ground surface and below a bottom of a housing surrounding the ground-engaging tool;
    adjusting a feature of the implement until the ground-engaging tool is no longer exposed, the adjusting comprising one of:
    adjusting a leg of the implement to lower the housing around the ground-engaging tool until the housing is in contact with the existing ground surface; and
    adjusting a position of the ground-engaging tool to a position within the housing.

16. The method of claim 15, wherein receiving the notification comprises an indication of a side of the implement having the exposed condition.

17. The method of claim 16, wherein adjusting the leg comprises adjusting a leg on the side of the implement having the exposed condition.

18. The method of claim 15, wherein adjusting a feature of the machine is performed while continuing to operate the ground-engaging tool.

19. The method of claim 15, wherein adjusting a feature of the implement is performed prior to operating the ground-engaging tool.

* * * * *